(12) United States Patent  
Yokoyama et al.

(10) Patent No.: US 11,199,077 B2  
(45) Date of Patent: Dec. 14, 2021

(54) OIL FIELD PUMP

(71) Applicant: MITSUBISHI HEAVY INDUSTRIES, LTD., Tokyo (JP)

(72) Inventors: Shimpei Yokoyama, Tokyo (JP); Nobuhiro Kunitake, Tokyo (JP); Takumi Hori, Tokyo (JP); Norihisa Takei, Tokyo (JP); Tanehiro Shinohara, Tokyo (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 38 days.

(21) Appl. No.: 16/794,389

(22) Filed: Feb. 19, 2020

(65) Prior Publication Data

US 2020/0378226 A1    Dec. 3, 2020

(30) Foreign Application Priority Data

May 31, 2019   (JP) .............................. JP2019-102336

(51) Int. Cl.
*E21B 43/12*     (2006.01)
*F04D 13/08*     (2006.01)
(Continued)

(52) U.S. Cl.
CPC .......... *E21B 43/128* (2013.01); *F04D 13/086* (2013.01); *F04D 29/046* (2013.01); *F04D 29/0413* (2013.01); *H02K 7/08* (2013.01); *F05B 2240/52* (2013.01); *F05B 2260/63* (2013.01); *F05B 2260/98* (2013.01)

(58) Field of Classification Search
CPC ...... E21B 43/128; F04D 29/061; F04D 13/10; F04D 29/0413; F04D 29/046; F04D 13/086; F04C 13/008; F04C 2240/10; F04C 2240/20; F04C 2240/50; F04C 2240/806; F05B 2240/52; F05B 2260/63; F05B 2260/98; F16C 33/10; H02K 2205/03; H02K 7/08
See application file for complete search history.

(56) References Cited

U.S. PATENT DOCUMENTS 5,297,927 A     3/1994   Aizawa et al.
8,672,641 B2*   3/2014   Yuratich .................. H02K 7/09
                                                                    417/44.11
(Continued)

FOREIGN PATENT DOCUMENTS

JP           5-202892       8/1993

*Primary Examiner* — Dominick L Plakkoottam
(74) *Attorney, Agent, or Firm* — Wenderoth, Lind & Ponack, L.L.P.

(57) ABSTRACT

An oil field pump installed within a pipe that connects to an oil field, feeds accumulated extraction oil in a predetermined direction and includes a rotor, a stator mounted on the outer circumference of the rotor, a flow path for flow of the extraction oil connecting an area formed within the rotor to an area formed between the rotor and the stator, a thrust bearing that supports the axial weight of the rotor and the stator, and a supply pipe that supplies a portion of the extraction oil in the flow path to the thrust bearing. The thrust bearing includes a protrusion part fixed to the outer circumference of the rotor and rotating as one piece with the rotor, and a facing part fixed to the stator and facing opposite a surface in the axial direction of the protrusion.

6 Claims, 7 Drawing Sheets

(51) Int. Cl.
    *F04D 29/046* (2006.01)
    *H02K 7/08* (2006.01)
    *F04D 29/041* (2006.01)

(56) References Cited

U.S. PATENT DOCUMENTS

| | | | | |
|---|---|---|---|---|
| 8,851,864 | B2* | 10/2014 | Prieto | H02K 7/16 |
| | | | | 417/423.3 |
| 9,556,877 | B2* | 1/2017 | Meuter | F04D 29/0473 |
| 10,541,582 | B2* | 1/2020 | Li | H02K 9/197 |
| 10,844,875 | B2* | 11/2020 | Zia | E21B 43/121 |
| 2020/0378224 | A1* | 12/2020 | Yokoyama | E21B 43/128 |
| 2020/0378225 | A1* | 12/2020 | Yokoyama | E21B 43/126 |

* cited by examiner

OIL FIELD PUMP

CROSS-REFERENCE TO RELATED APPLICATIONS

The present application claims priority to and incorporates by reference the entire contents of Japanese Patent Application No. 2019-102336 filed in Japan on May 31, 2019.

FIELD

The present invention relates to an oil field pump installed in oil fields.

BACKGROUND

Oil fields extract oil by way of oil field equipment including pipes connecting to positions where oil can be extracted and pumps installed within the pipes to feed the oil within the pipes. The pumps are installed within the fluid in the pipes and feed the oil within the pipes to the oil extraction port. The pumps feed oil extracted from oil fields and the fluid therefore sometimes contains foreign matter. The foreign matter mixes in between rotating parts and stationary parts and causes breakdown if the foreign matter accumulates as deposits.

A vertical shaft type pump including a bearing within the pump path disclosed in patent literature 1 for example, is a structure that includes a rotary lubrication tank containing a bearing within the pump path, and also includes an opening connecting to the pump path.

CITATION LIST

Patent Literature

Patent Literature 1: Japanese Patent Application Laid-open No. H5-202892 A

SUMMARY

Technical Problem

Here, the oil field pump includes a pump body containing an impeller to compress and feed the extraction oil, and a motor that is connected to the pump body and serves as a drive source. The oil field pump further includes a bearing mechanism. Lubricating oil may be supplied to the bearing mechanism by installing supply lines for lubricating oil across the entire area of the pipes or by performing periodic maintenance. In contrast, when lubricating the bearing mechanism with extraction oil, foreign matter might possibly contaminate the bearing mechanism of the oil field pump. The device according to patent literature 1 can reduce the influence of the foreign matter but will not prove effective on oil pumps installed underground at a remote location from the ground facility.

To resolve the aforementioned problems with the related art, the present invention has the objective of providing an oil field pump capable of reducing the need for frequent maintenance.

Solution to Problem

To achieve the above object, an oil field pump installed within a pipe that connects to an oil field, the oil field pump being configured to feed accumulated extraction oil in a predetermined direction is disclosed. The oil field pump includes a rotor, a stator mounted on an outer circumference of the rotor, a flow path for flow of the extraction oil that connects an area formed within the rotor to an area formed between the rotor and the stator, a thrust bearing that supports an axial weight of the rotor and the stator, and a supply pipe that supplies a portion of the extraction oil in the flow path to the thrust bearing. The thrust bearing includes a protrusion part fixed to the outer circumference of the rotor and configured to rotate as one piece with the rotor, and a facing part fixed to the stator and facing opposite a surface in an axial direction of the protrusion part, the extraction oil is filled between the protrusion part and the facing part, and the protrusion part at the surface opposite the facing part moves to an outer side in a radial direction from an upstream side towards a downstream side in a rotational direction, and a groove is formed with an end on the downstream side open on the outer side in the radial direction.

It is preferable that the thrust bearing includes a pad mounted on a surface facing opposite the protrusion part, the pad including the groove, and the distance of the pad to the facing part becomes shorter towards the downstream side in the rotational direction.

To achieve the above object, an oil field pump installed within a pipe that connects to an oil field, the oil field pump being configured to feed accumulated extraction oil in a predetermined direction is disclosed. The oil field pump includes a rotor, a stator mounted on an outer circumference of the rotor, a flow path for flow of the extraction oil that connects an area formed within the rotor to an area formed between the rotor and the stator, a thrust bearing that supports a weight of the rotor and the stator in an axial direction, and a supply pipe that supplies a portion of the extraction oil in the flow path to the thrust bearing. At least one of the supply pipe or the flow path further upstream than the thrust bearing includes a spiral-shaped groove formed on an outer side in a radial direction.

It is preferable that the supply pipe is formed between rotor and the stator, and the groove is formed on a surface on the stator side of the supply pipe.

It is preferable that the oil field pump further includes a discharge pipe having one end connected to the groove, and another end connected to the flow path further downstream than a connector of the supply pipe, the discharge pipe being configured to discharge the extraction oil supplied to the thrust bearing to the flow path.

Advantageous Effects of Invention

The present invention is capable of reducing the need for frequent maintenance.

DESCRIPTION OF EMBODIMENTS

Figure 1:
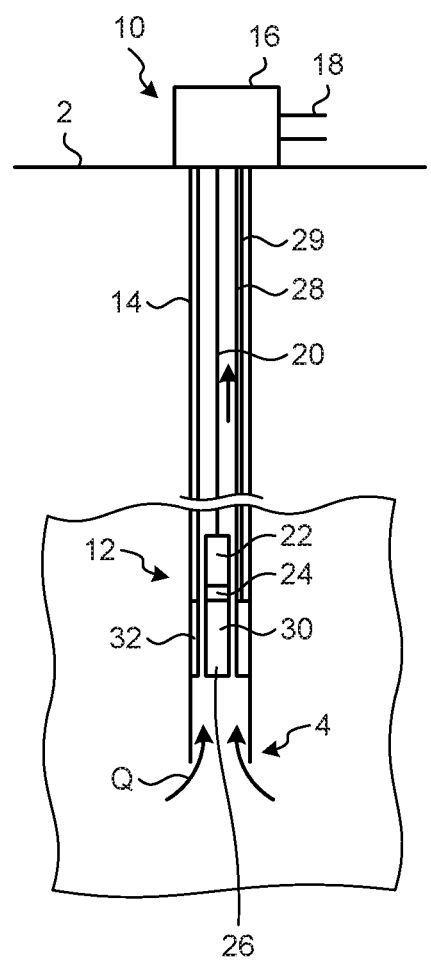
FIG. 1 is an overall structural view of an oil extraction device including an oil field pump of the embodiment of the present invention.

The embodiment of the present invention is described next while referring to the drawings. The present invention is not limited by the embodiment. The structural elements in the following embodiments can be easily substituted by one skilled in the art or may include essentially the same item.

FIG. 1 is an overall structural view of an oil extraction device including an oil field pump of the embodiment of the present invention. An oil extraction device 10 is installed on an installation surface 2. The installation surface 2 is a structure installed at an oil field 4. When the oil field 4 is on the ocean floor or in other words when the oil field 4 is an offshore oil field, the installation surface 2 is a structure at sea level. When the oil field 4 is below ground, the installation surface 2 is a structure at ground level. The oil field 4 is an area to accumulate the oil for extraction.

As illustrated in FIG. 1, the oil extraction device 10 includes a pump (oil field pump) 12, a pipe 14, a ground facility 16, and a guide pipe 18. The pump 12 is equipment that feeds the extraction oil Q accumulated in the oil field 4. The extraction oil Q might contain solid matter such as ores in addition to the crude oil. The pipe 14 is a flow path for the internal flow of extraction oil Q. One end of the pipe 14 is installed in the oil field 4 and the other end is connected to the ground facility 16. The pump 12 is installed at a section on the oil field 4 side in the pipe 14. The ground facility 16 includes a device to wind up a wire 20 such as a coil turbine or a wire winder mechanism described below. The guide pipe 18 guides the extraction oil Q.

Figure 2:
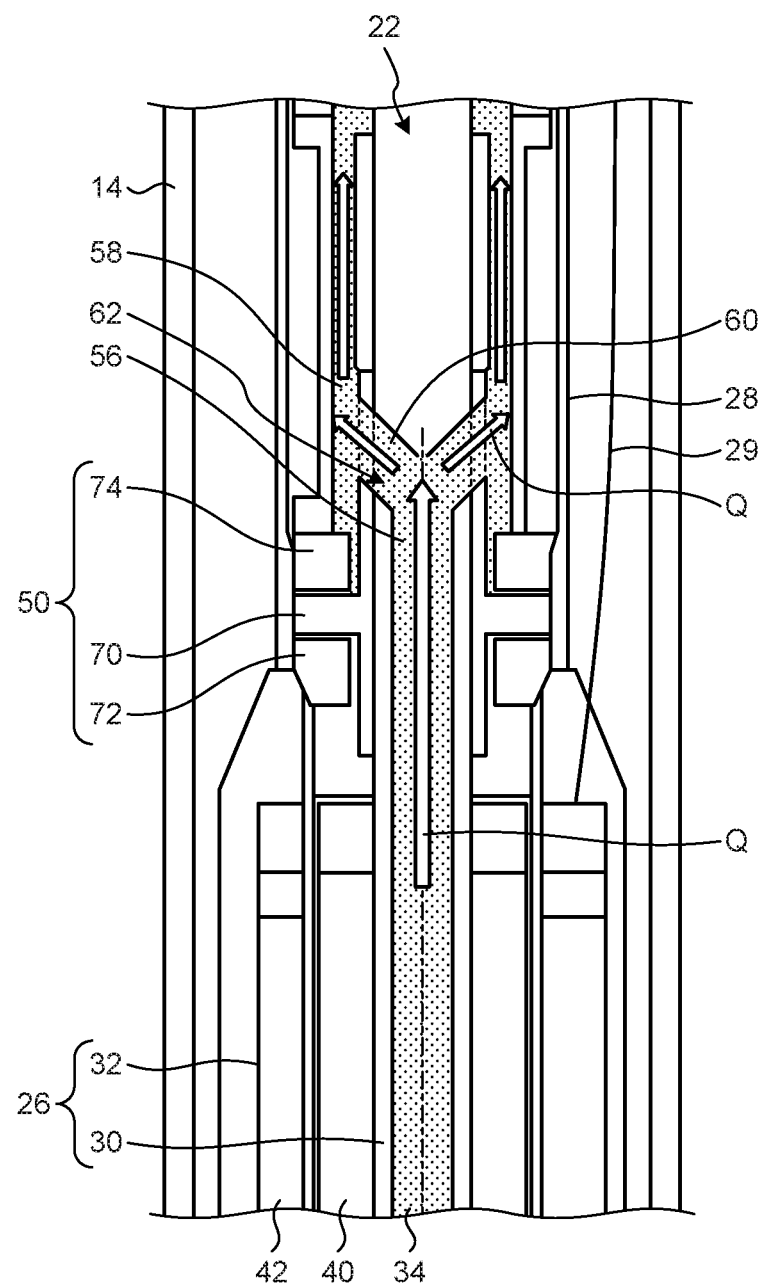
FIG. 2 is a fragmentary cross sectional view of the oil field pump illustrated in FIG. 1.
Figure 3:
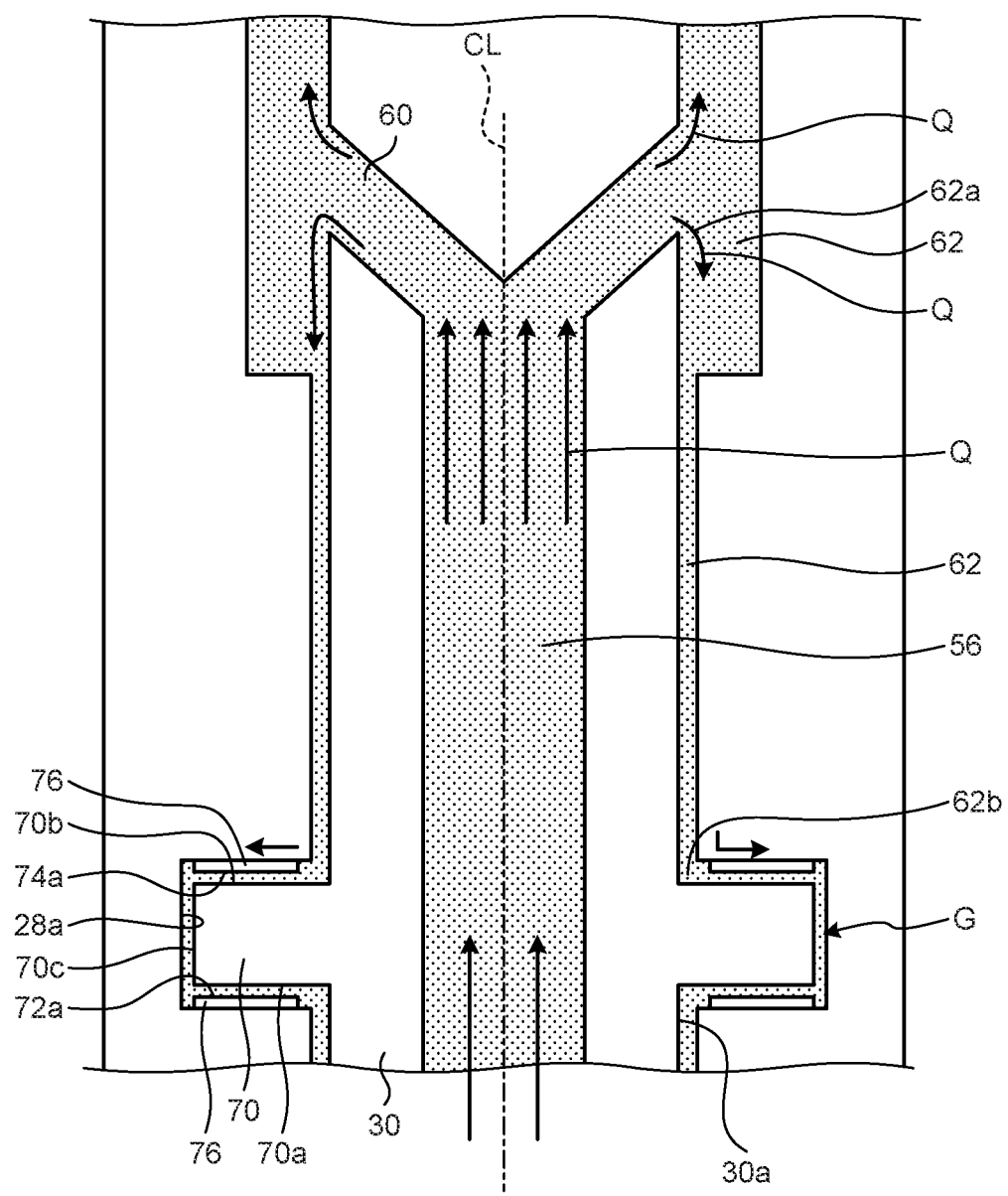
FIG. 3 is a cross-sectional view illustrating one example of the mechanism that supplies extraction oil to a thrust bearing.

The pump 12 is described next while referring to FIG. 2 through FIG. 5 in addition to FIG. 1. FIG. 2 is fragmentary cross sectional view of the oil field pump illustrated in FIG. 1. FIG. 3 is a cross-sectional view illustrating one example of the mechanism that supplies the extraction oil Q to the thrust bearing. The pump 12 includes a wire 20, a pump body 22, a coupler 24, a motor 26, a stationary pipe 28, an electric cable 29, a thrust bearing 50, and a supply pipe 62.

The pump body 22, the coupler 24, and part of the motor 26 (rotor 30 described below) are integrally connected in the pump 12. The upper end of the pump body 22 connects to the wire 20. The wire 20 can be wound up and fed out by the above described ground facility 16. The stationary pipe 28 fixes a stator 32 that is a portion of the motor 26. The extraction oil Q can flow within the interior of the stationary pipe 28. The electric cable 29 connects between the ground facility 16 and the stator 32 and supplies electrical power to the stator 32.

In the pump 12 of the present embodiment, the pump body 22, the coupler 24, and motor 26, are detachable from the electric cable 29. In other words, winding the wire 20 separates the pump body 22, the coupler 24, and the rotor 30 of the motor 26 as an integrated piece from the stator 32 and raises them upward within the stationary pipe 28. This structure can easily insert and pull up the pump body 22, the coupler 24, and the rotor 30 as an integrated piece so that installing a large scale rig or similar equipment at the installation surface 2 is not necessary.

The motor 26 includes the rotor (rotating part) 30 and the stator (stationary part) 32. The rotor 30 is a cylindrical shape. A flow path (first area) 34 for the flow of extraction oil Q therein is formed in the rotor 30. The flow path (first area) 34 for the flow of extraction oil Q connects to a flow path of the connecting part 24. In the connecting part 24, flow paths 56, 58 and a branch part 60 are formed as passages for extraction oil Q. The flow path 56 connects to the flow path (first area) 34 and the branch part 60. The branch part 60 supplies the extraction oil Q that flows within the rotor 30 to a space between the rotor 20 and the stator 32. The flow path 58 is installed on the upper side perpendicular to the branch part 60, and the internal circumferential surface forms the rotor 30 and the external circumferential surface forms the stator 32. The flow path 58 connects to the flow path of the pump 22.

The rotor 30 can rotate centering on the center axis CL. The rotor 30 includes a permanent magnet 40. The permanent magnet 40 is mounted as one piece with the rotor 30 on the outer circumference of the rotor 30. The stator 32 includes an electromagnet 42. The electromagnet 42 generates a magnetic field from the electrical power supplied from the electric cable 29. The interaction between the magnetic field generated from the electromagnet 40 and the magnetic field generated from the permanent magnet 42 allows rotation of the rotor 30 centering on the center axis CL. An impeller of the pump 22 is mounted on the upper side perpendicular to the rotor 30. Rotation of the rotor 30 rotates the impeller that forms one piece with the rotor 30. The rotation of the impeller compresses and feeds the extraction oil Q on the periphery to the interior of the rotor 30. In other words, the rotor 30 rotates as one piece by the attachment with the rotor (rotating part) of the pump 12. The stator 32 is attached to the stator (stationary part) of the pump 12.

In the coupler 24, the upper end along the central axis of the rotor 30 is inserted into the lower end of the stationary pipe 28. The flow path 56 is connected to the branch part 60 within the stationary pipe 28. The branch part 60 feeds the extraction oil Q flowing upwards perpendicularly within the flow path 34 radially to the outer side.

As illustrated in FIG. 2 and FIG. 3, the pump 12 includes a supply pipe (second area) 62 that supplies a portion of the extraction oil Q flowing in the flow paths 34, 56, and 58, and the branch part 60 to the thrust bearing 50. The supply pipe (second area) 62 is an area enclosed between the rotor 30 and the stator 32 and is a cylindrical-shaped flow path. An extraction port 62a at one end of the supply pipe (second area) 62 connects to the branch part 60, and the supply port 62b at the other end of the supply pipe (second area) 62 connects to the gap G of the thrust bearing 50. The extraction oil Q in the supply pipe (second area) 62 flows from the branch part 60 toward the thrust bearing 50 from the effect of the centrifugal force acting on the extraction oil Q due to rotation of the rotor 30, the difference in pressure between the positions, and due to gravitational force.

The thrust bearing 50 includes a protrusion part 70, a retainer part 72 with a facing part 72a, and a retainer part 74 including a facing part 74a. The protrusion part 70 is fixed to the outer circumference 30a of the rotor 30 and rotates as one piece with the rotor 30. The protrusion part 70 is for example a disk shape and includes a first surface 70a and a second surface 70b mounted on the front and rear along the axial direction of the center axis CL. In the present embodiment, the first surface 70a is a surface on the lower side in a perpendicular direction, and the second surface 70b is a surface on the upper side in a perpendicular direction. On the retainer parts 72, 74, bearing pads 76 are mounted on the surface facing the protrusion part 70. The facing part 72a and the facing part 74a are the surfaces of the bearing pad 76.

The retainer parts 72, 74 are members on a ring, and are fixed to the stator of the coupler 24, and in the present embodiment the stationary pipe 28. The retainer parts 72, 74 are attachable and detachable from the stationary pipe 28 by way of a tightening mechanism such as screws that attach them to the stationary pipe 28. The rotor 30 can in this way be removed. The facing part 72a faces the first surface 70a of the protrusion part 70. The facing part 74a faces the second surface 70b of the protrusion part 70. The protrusion part 70 includes a cylindrical-shaped side surface 70c centering on the center axis CL. The side surface 70c faces the inner circumferential surface 28a of the stationary pipe 28.

Gaps G filled with lubricating oil are respectively formed between the first surface 70a and the facing part 72a, the second surface 70b and the facing part 74b, and the side surface 70c and the inner circumferential surface 28a. By filling the extraction oil into the gaps G, the thrust bearing 50 can smoothly rotate the rotor 30, and support the axial load on the center axis CL between the rotor 30 and stator 32. The extraction oil Q that is extracted from the oil field 4 is utilized as the lubricating oil.

Figure 4:
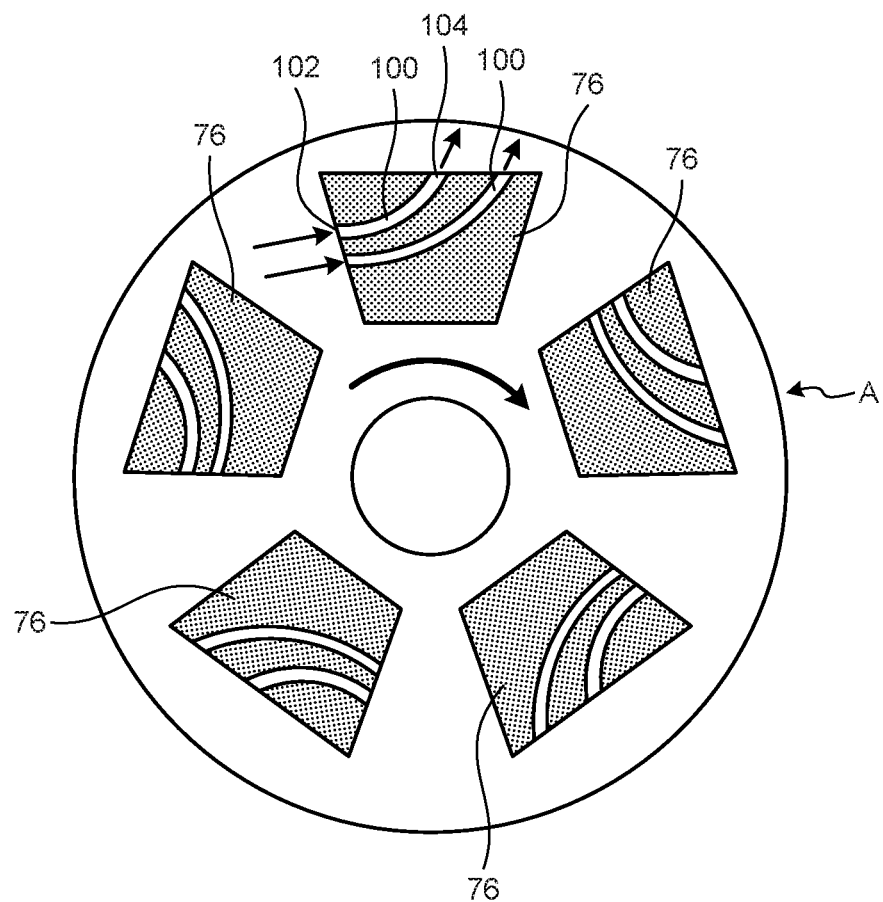
FIG. 4 is a frontal view illustrating the overall structure of the thrust bearing.
Figure 5:
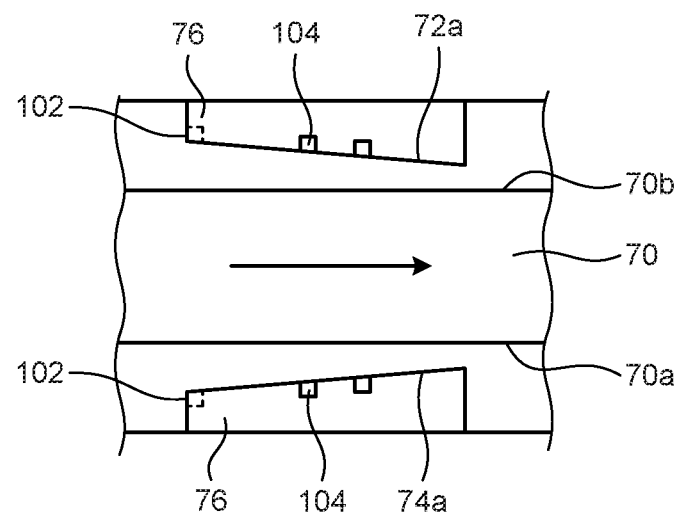
FIG. 5 is a side view of the thrust bearing as seen from the A direction in FIG. 4.

FIG. 4 is a frontal view illustrating the overall structure of the thrust bearing. FIG. 5 is a side view of the thrust bearing as seen from the A direction in FIG. 4. The thrust bearing 50 as already described, includes a protrusion part 70 and retainer parts 72, 74 facing the surface on the axial ends of the protrusion part. On the retainer part 72, the facing part 72a faces the first surface 70a of the protrusion part 70. On the retainer part 74, the facing part 74a faces the first surface 70b of the protrusion part 70. Here, a plurality of the bearing pads 76 are respectively mounted on the facing parts 72a, 74a of the retainer parts 72, 74 on the thrust bearing 50.

As illustrated in FIG. 4, the pads 76 are mounted in the rotational direction of the rotor 30. The pads 76 are preferably mounted equidistantly along the circumference. The bearing pads 76 face opposite the protrusion part 70, and contact the protrusion part 70 as the facing parts 72a, 74a instead of the retainer parts 72, 74 when the protrusion part 70 moves a predetermined distance along the axis. The bearing pad 76 is formed from material with lower rigidity than the protrusion part 70 and wears away when in contact with the protrusion part 70. The surface of the bearing pads 76 facing opposite the protrusion part 70 is an oblique surface whose distance to the protrusion part 70 becomes shorter from the upstream side to the downstream side along the rotational direction of the rotor 30. Therefore, when the protrusion part 70 rotates and the predetermined position moves, the distance between the predetermined position and the bearing pads 76 become gradually shorter.

On the bearing pads 76, the grooves 100 are formed on a surface facing opposite the protrusion part 70. In the present embodiment, two grooves 100 are formed but the number of the grooves is not limited to two grooves. The grooves 100 extend to both ends of the bearing pad 76. The ends 102 on the upstream side in the rotational direction of the grooves 100 are open on the upstream side surface in the rotational direction of the bearing pad 76. The ends 104 on the downstream side in the rotational direction of the grooves 100 are open on the outer sides in the radial direction of the pads 76.

The pump 12 can supply extraction oil Q to the thrust bearing 50 by forming a supply path 62 connecting with the branch part 60 of the flow path. Lubricating oil can in this way be supplied to the thrust bearing 50 without having to form another system to supply lubricating oil.

By forming the grooves 100 in the bearing pads 76, the pump 12 can flow extraction oil Q for the gap G of the protrusion part 70 and the facing part 72a, 74a, from the ends 102 to the ends 104 along the grooves 100. When there is solid matter within the extraction oil Q, the solid matter tends to move more easily along the wider grooves 100 than in other sections. Therefore, even when there is also inflow of solid matter in the gap G, solid matter can move along the grooves 100 to the outer side rather than the bearing pads 76 on the outer side along the radius. In this way, the movement of solid matter into the narrow gap between the pad 76 and the protrusion part 70 that is the section on downstream side of rotation direction of the surface of the pad 76 can be suppressed. Therefore, even when solid matter is flowing into the thrust bearing 50, it can easily be discharged radially to the outer side and bite-in by solid matter between the protrusion part 70 and the retainer parts 72, 74 can be prevented. The possibility of damage to the thrust bearing 50 is in this way mitigated and the life of the thrust bearing 50 can be extended.

In the present embodiment, by changing the facing parts 72a, 74a of bearing pad 76 from upstream to downstream in the rotational direction and setting a particular shape when approaching near the facing parts 72a, 74a, the surface pressure generated by supplying extraction oil Q into the gap G can be increased and a load can be more satisfactorily received along the direction of thrust.

In the present embodiment, the bearing pads 76 are formed on the retainer parts 72, 74 to form the facing parts 72a, 74a, however the present invention is not limited to this arrangement and the bearing pads 76 may be formed on the first surface 70a and the second surface 70b of the protrusion part 70. In this case also, by forming an opening of the grooves 100 on the inflow side of the extraction oil Q relative to the bearing pads 76 and forming another opening on the outer side in the radial direction, the solid matter contained within the extraction oil Q can be guided towards the outer side in the radial direction.

By forming the bearing pads 76 on both surfaces in the axial direction, the thrust bearing 50 can receive the load in the direction of thrust even when the rotor 30 moves perpendicularly downward by the force of gravity, and even when the rotor 30 moves perpendicularly upward by pressure from the pump 12.

Figure 6:
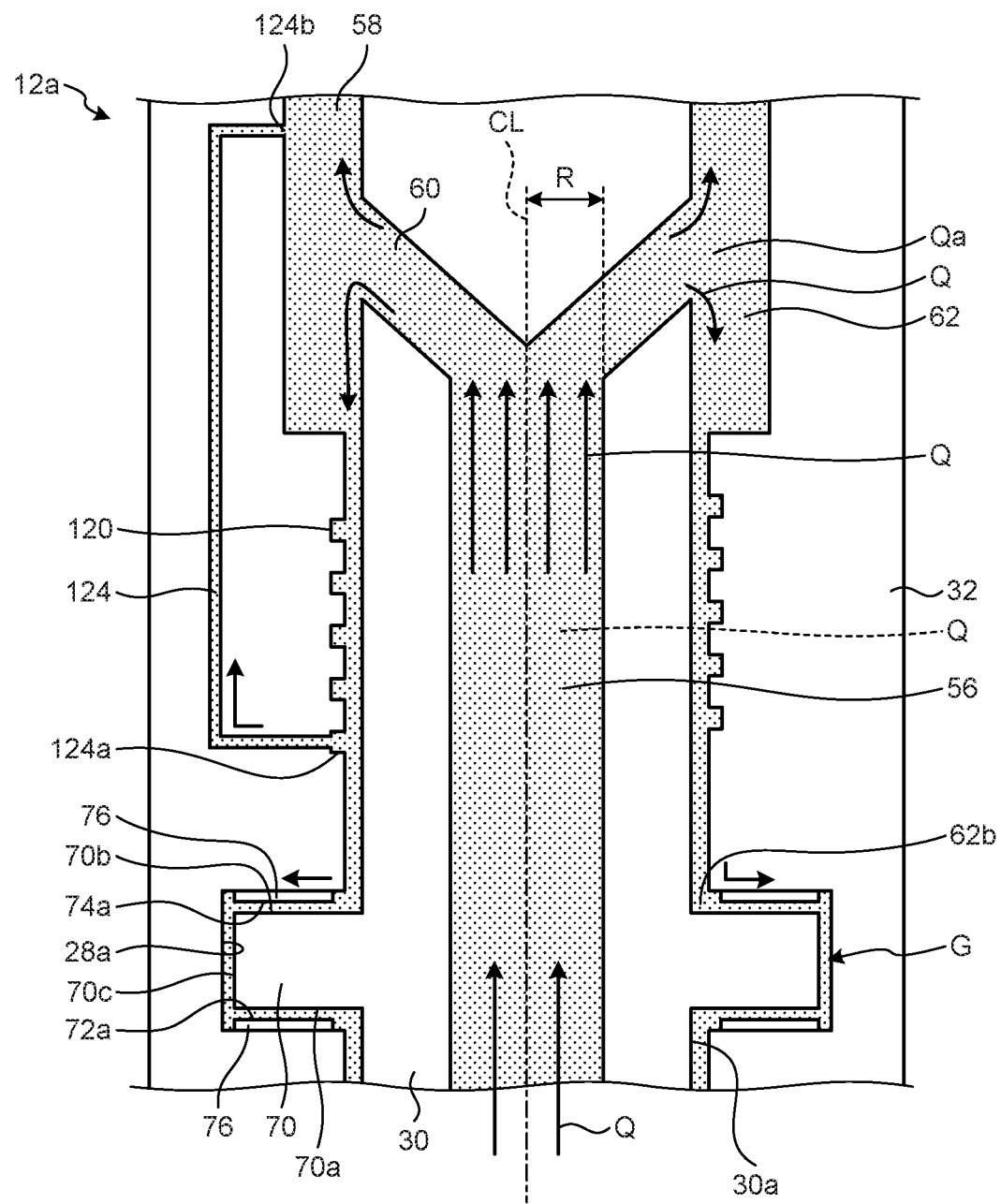
FIG. 6 is a cross sectional view illustrating another example of the mechanism that supplies the extraction oil to the thrust bearing.
Figure 7:
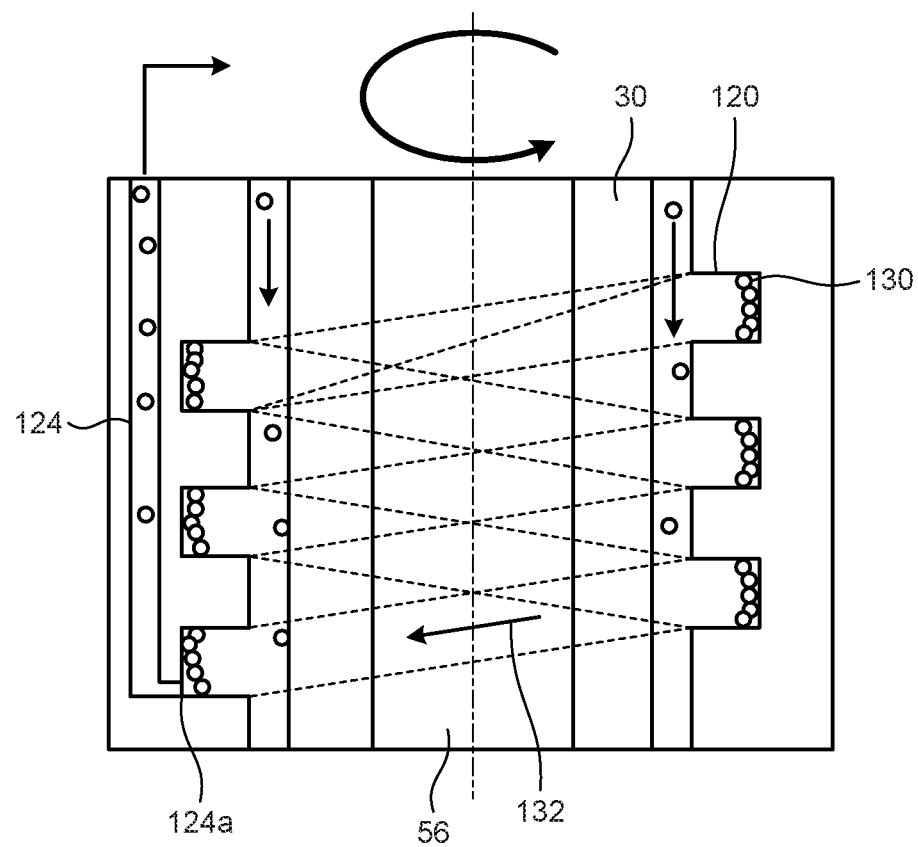
FIG. 7 is an enlarged cross sectional view illustrating the structure of a supply pipe.

Next, FIG. 6 is a cross sectional view illustrating another example of the mechanism that supplies the extraction oil to the thrust bearing. FIG. 7 is an enlarged cross sectional view illustrating the structure of the supply pipe. The pump 12a illustrated in FIG. 6 and FIG. 7 is basically identical to the pump 12 illustrated in FIG. 1 through FIG. 5 except for the mechanism to remove solid matter from the extraction oil Q.

The pump 12a illustrated in FIG. 6 includes a groove 120 formed in the supply pipe 62 and a discharge pipe 124. The groove 120 is formed on the surface of the supply pipe 62 on the outer side in the radial direction, or in other words, is formed on the surface of the stator 32. The groove 120 is formed in a spiral shape on the inner circumferential surface of the cylindrical-shaped stator. The groove 120 is a groove with a larger width than the solid matter 130 contained in the extraction oil Q flowing into the flow path 34. Both ends of the groove 120 terminate within the supply pipe 62.

The discharge pipe 124 is a pipe installed within the stator 32. The inflow port 124a as one end of the discharge pipe 124 connects to the end on the lower side in perpendicular direction of the groove 120, and the discharge port 124b as the other end of the discharge pipe 124 connects to the flow path 58 that is farther downstream than the connection part of the supply pipe 62. The flow in the discharge pipe 124 from the inflow port 124a towards the discharge port 124b is formed from the centrifugal force of the rotor 30 rotation acting on the extraction oil Q, and the difference in pressure between each position.

In the pump 12a illustrated in FIG. 6 and FIG. 7, by forming a groove 120 on the surface of the supply pipe 62 on the outer side in the radial direction, and by applying a centrifugal force on the outer side in the radial direction by way of the rotation of the rotor 30, the solid matter 130 contained in the extraction oil Q and being moved to the outer side in the radial direction can be collectively trapped in the groove 120. The spiral shape of the groove 120 can also move the solid matter 130 collectively trapped in the groove 120 in a direction along the flow of the extraction oil Q. Therefore, in the present embodiment, the solid matter 130 within the groove 120 can be moved to the perpendicular direction downstream side. The inflow of the solid matter 130 to the thrust bearing 50 can in this way be reduced.

By installing the discharge pipe 124, the solid matter 130 collectively trapped in the groove 120 can be discharged farther downstream than the position for supplying extraction oil Q to the thrust bearing 50. The possibility of solid matter 130 flowing into the thrust bearing 50 can in this way be reduced and the need for frequent maintenance can be reduced.

In the present embodiment, the grooves 120 are formed in the supply pipe 62, however the present invention is not limited to this arrangement. The grooves 120 may be installed or formed (anywhere) in the pump 12a as long as a position is set that is at the upstream side in the flow direction of the extraction oil Q and a position is set where the rotor and the stator are facing each other, rather than a position that prevents the inflow of solid matter. For example, when a portion of the flow path 34 is installed between the rotor 30 and the stator 32 not in the inside of the rotor 30, the grooves 120 may be formed in the area formed between the rotor 30 and the stator 32 in the flow path 34. When the flow direction of the extraction oil Q in the area where the grooves 120 are formed is a flow towards the perpendicular direction upstream side, then the discharge pipe 124 is preferably formed at the perpendicular direction upstream side ends. The discharge pipe 130 is preferably formed on the downstream end of the flow direction of the extraction oil Q in the groove 120, however the present invention is not limited to this arrangement.

Figure 8:
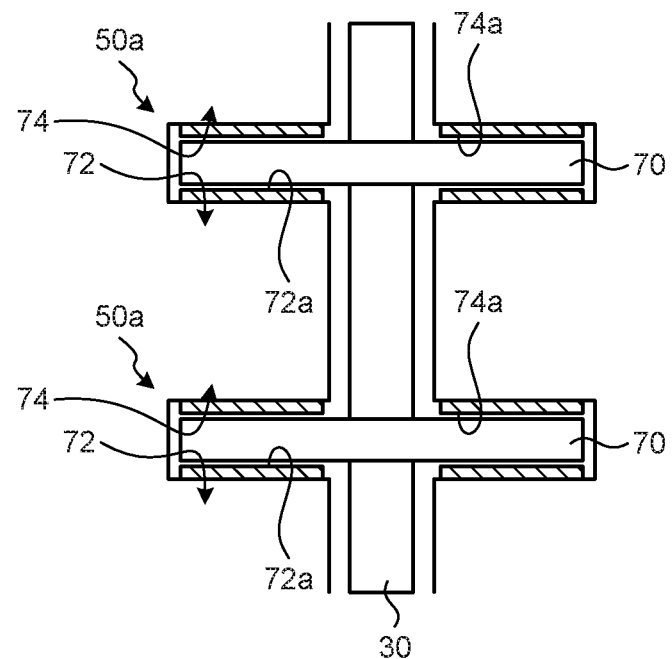
FIG. 8 is an overall structural view illustrating another example of the thrust bearing.

FIG. 8 is an overall structural view illustrating another example of the thrust bearing. As illustrated in FIG. 8, the thrust bearing 50a may be formed in multiple steps along the axial direction of the center axis CL. This structure disperses the load on the thrust bearing 50a in the axial direction along the center axis CL. Therefore, the surface pressure acting on each single thrust bearing 50a is reduced and the gap G can be enlarged. In structures utilizing extraction oil Q containing solid matter as lubricating oil, the bite-in of solid matter among the first surface 70a, the second surface 70b, and the facing parts 72a, 74a of the protrusion part 70 is reduced and a long life can be achieved.

Figure 9:
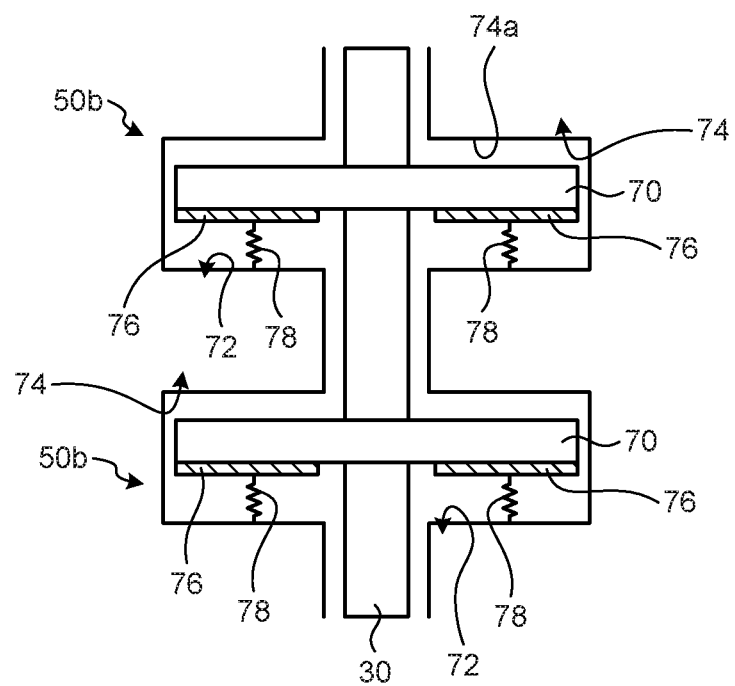
FIG. 9 is an overall structural view illustrating another example of the thrust bearing.

FIG. 9 is an overall structural view illustrating another example of the thrust bearing. As illustrated in FIG. 9, when the thrust bearing 50b is formed in multi-stages along the axial direction of the center axis CL, a spring part 78 may be installed between the protrusion part 70 and at least either of the retainer parts 72, 74. The surface pressure acting on each single thrust bearing 50a can in this way be a uniform surface pressure. The bearing pads 76 may also be installed on the protrusion part 70.

As illustrated in FIG. 8 and FIG. 9, when multi-stage thrust bearings are installed, the supply pipe 62 may be installed at each protrusion part 70 gap, or may be installed so that the extraction oil Q is supplied to the gap of the next protrusion part after passing the gap of one protrusion part.

The technical scope of the present invention is not limited to the above embodiment and changes in a range not departing from the spirit and scope of the present invention may be added. For example, the structure of the thrust bearing with the grooves 100 formed on the pad of the embodiment, and the structure with the grooves 120 formed in the supply pipe 62 may be utilized in one pump.

REFERENCE SIGNS LIST

2 Installation surface
4 Oil field
10 Oil extraction device
12 Pump
14 Pipe
16 Ground facility
18 Guide pipe
20 Wire
22 Pump body
24 Coupler
26 Motor
28 Stationary pipe
28a Inner circumferential surface
29 Electric cable
30 Rotor
30a Outer circumference
32 Stator
34, 56, 58 Flow path
40 Permanent magnet
42 Electromagnet
50, 50a, 50b Thrust bearing
60 Branch part
62, 66 Supply pipe
62a Oil extraction port
62b Supply port
64, 64a Filter
70 Protrusion part
70a First surface
70b Second surface
70c Side surface
72, 74 Retainer part
72a, 74a, 74b Facing part
76 Bearing pad
78 Spring part
100 Groove
102, 104 End
120 Groove
124 Discharge pipe
124a Inflow port
124b Discharge port
130 Solid matter
G Gap
Q Extraction oil

The invention claimed is:

1. An oil field pump to be installed within a pipe that connects to an oil field, the oil field pump being configured to feed accumulated extraction oil in a predetermined direction, the oil field pump comprising:
a rotor;

a stator mounted on an outer circumference of the rotor;
a coupler for flow of the extraction oil that connects a first area formed within the rotor to a second area formed between the rotor and the stator;
a branch part for supplying the extraction oil flowing in the first area to the second area;
a thrust bearing that supports an axial weight of the rotor and the stator; and
a supply pipe that supplies a portion of the extraction oil in the branch part to the thrust bearing,
wherein the supply pipe connects the branch part with the thrust bearing, and
wherein the rotor and the supply pipe are configured such that a centrifugal force generated by a rotation of the rotor and acting on the extraction oil and a difference in pressure generated in the supply pipe supply the extraction oil to the thrust bearing from the branch part.

2. The oil field pump according to claim 1, wherein
the thrust bearing includes a protrusion part fixed to the outer circumference of the rotor and configured to rotate as one piece with the rotor, and a facing part fixed to the stator and facing opposite a surface in an axial direction of the protrusion part,
the extraction oil is filled between the protrusion part and the facing part, and
the protrusion part at the surface opposite the facing part moves to an outer side in a radial direction from an upstream side towards a downstream side in a rotational direction, and a groove is formed with an end on the downstream side open on the outer side in the radial direction.

3. The oil field pump according to claim 2, wherein
the thrust bearing includes a pad mounted on a surface facing opposite the protrusion part, the pad including the groove, and
the distance of the pad to the facing part becomes shorter towards the downstream side in the rotational direction.

4. The oil field pump according to claim 1, wherein
at least one of the supply pipe or the first area further upstream than the thrust bearing includes a spiral-shaped groove formed on an outer side in a radial direction.

5. The oil field pump according to claim 4, wherein
the supply pipe is formed between rotor and the stator, and
the groove is formed on a surface on the stator side of the supply pipe.

6. The oil field pump according to claim 4, further comprising a discharge pipe having one end connected to the groove, and another end connected to the second area further downstream than a connector of the supply pipe, the discharge pipe being configured to discharge the extraction oil supplied to the thrust bearing to the second area.

* * * * *